United States Patent
Waser et al.

(10) Patent No.: US 7,988,783 B2
(45) Date of Patent: Aug. 2, 2011

(54) ADDITIVE FOR HYDRAULICALLY SETTING SYSTEMS, THE HYDRAULICALLY SETTING MIXTURES AND THE USE THERE OF

(75) Inventors: Hanspeter Waser, Hildisrieden (CH); Erwin Buhler, Sempach-Stadt (CH); Robert Koelliker, Oberkirch (CH)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 12/550,180

(22) Filed: Aug. 28, 2009

(65) Prior Publication Data

US 2010/0087570 A1    Apr. 8, 2010

Related U.S. Application Data

(63) Continuation of application No. 10/517,195, filed as application No. PCT/EP03/06132 on Jun. 11, 2003, now abandoned.

(30) Foreign Application Priority Data

Jun. 12, 2002    (DE) ................... 102 26 088

(51) Int. Cl.
C04B 28/02    (2006.01)
C04B 24/26    (2006.01)
C04B 24/38    (2006.01)

(52) U.S. Cl. ............ 106/823; 106/162.1; 106/217.7; 106/819; 525/50

(58) Field of Classification Search ......... 106/823, 106/162.1, 217.7, 819; 525/50
See application file for complete search history.

(56) References Cited

U.S. PATENT DOCUMENTS

| | | | |
|---|---|---|---|
| 4,265,674 A | | 5/1981 | Debus et al. |
| 4,502,887 A | | 3/1985 | Tsuda |
| 5,352,290 A | | 10/1994 | Takeshita et al. |
| 5,372,642 A | | 12/1994 | Bartz et al. |
| 5,494,516 A | | 2/1996 | Drs et al. |
| 5,853,430 A | * | 12/1998 | Shindo et al. .......... 8/137 |
| 5,925,699 A | | 7/1999 | Ellenberger et al. |
| 5,959,029 A | | 9/1999 | Koelliker et al. |
| 6,054,022 A | | 4/2000 | Helwig et al. |
| 6,242,406 B1 | * | 6/2001 | Katsuda et al. .......... 510/357 |
| 6,384,111 B1 | | 5/2002 | Kistenmacher et al. |
| 6,465,412 B1 | | 10/2002 | Mahieu et al. |
| 7,250,488 B1 | | 7/2007 | Akiyama et al. |
| 2002/0045684 A1 | | 4/2002 | Bacher et al. |
| 2002/0121230 A1 | | 9/2002 | Colombet et al. |

FOREIGN PATENT DOCUMENTS

| | | |
|---|---|---|
| DE | 39 10730 | 4/1990 |
| DE | 203 04 239 | 5/2003 |
| EP | 0 008 094 | 2/1980 |
| EP | 0 520 413 | 12/1992 |
| EP | 0 573 847 | 12/1993 |
| EP | 0 723 975 | 7/1996 |
| EP | 1 004 557 | 6/1999 |
| EP | 1 180 525 | 2/2002 |
| EP | 1 180 535 | 2/2002 |
| EP | 0 946 617 | 3/2002 |
| EP | 1 197 480 | 4/2002 |
| FR | 2 714 912 | 7/1995 |
| JP | 8 217 508 | 8/1996 |
| WO | WO 86/00291 | 1/1986 |
| WO | WO 00/42144 | 7/2000 |
| WO | WO 0042144 A1 * | 7/2000 |

OTHER PUBLICATIONS

Shim-Etsu Chemical Co., Ltd.; Melolose Water-Soluble Cellose Ether Catalouge (2003).

* cited by examiner

*Primary Examiner* — Kelechi C Egwim
(74) *Attorney, Agent, or Firm* — Kenyon & Kenyon LLP

(57) ABSTRACT

The invention relates to an additive for hydraulically setting systems based on modified polycarboxylates and water-soluble ethers of high polymeric polysaccharides, optionally containing further standard additives, characterized by a content of a) a water-soluble ether of cellulose or a cellulose-like compound with a viscosity of at least approximately 1,000 mPas, particularly at least approximately 2,000 mPas, measured as a 2% aqueous solution with a Brookfield viscosimeter at 20° C. and 20 rpm and b) a polycarboxylate, whose main chain is linked by means of ester, ether, imide and/or amide groups with polyethylene oxide-containing side chains. The invention also relates to hydraulic mixtures having a content of the above additive and the use thereof. Using the additive according to the invention in hydraulically setting systems comparable and in part much better characteristics are obtained compared with casein-containing formulations, such as a rheological flow behaviour comparable to casein, but with improved water retention.

10 Claims, 3 Drawing Sheets

ADDITIVE FOR HYDRAULICALLY SETTING SYSTEMS, THE HYDRAULICALLY SETTING MIXTURES AND THE USE THERE OF

CROSS-REFERENCE TO RELATED APPLICATIONS

The present application is a continuation of U.S. patent application Ser. No. 10/517,195, which is the national stage of PCT International Patent Application No. PCT/EP03/06132, having an international filing date of Jun. 11, 2003, each of which is expressly incorporated herein in its entirety by reference thereto.

FIELD OF THE INVENTION

The invention relates to additives for hydraulically setting systems based on polycarboxylates and water soluble ethers of high polymeric polysaccharides, the hydraulically setting mixtures with a content of such additives and the use thereof.

BACKGROUND INFORMATION

It is known from the prior art to extensively use casein as the superplasticiser for hydraulically setting formulations, i.e. as an additive which reduces viscosity in order to obtain a suitable flow behaviour. In formulations said casein component leads to particularly good characteristics, which could not hitherto be readily achieved with synthetic superplasticisers.

Casein is a natural product obtainable by acid treatment from milk. However, it suffers from a number of known disadvantages. Thus, casein is available in widely differing qualities and in part at a widely differing price level on the market, so that as a result of the non-constant composition reproducible applications are not possible. In addition, casein-containing formulations are forbidden in certain countries, such as e.g. Scandinavia, because they split off during hydrolysis of the amino groups present, which is not only toxicologically objectionable, but can also lead to the discoloration and damage to other materials.

Therefore there is a need for a material providing a similar performance profile to casein, but without suffering from the above disadvantages. So-called high performance concrete superplasticisers are in part used for this purpose and in the same way as casein-containing systems have good processability, easy handling, but a different performance profile. These superplasticisers are essentially subdivided into four groups, namely sulphonated melamine-formaldehyde condensates, sulphonated naphthalene-formaldehyde condensates, modified lignosulphonates and a further group from sulphonates, polyacrylates, polystyrene sulphonates, etc. For example, sulphonated melamine-formaldehyde superplasticisers are used to a significant extent, but are losing significance as a result of their tendency to release toxic formaldehyde.

The hitherto known synthetic superplasticisers were mainly developed for concrete, but as a result have in part also been used in mortars. However, the excellent, liquefying action of these known superplasticisers is only maintained for a short time, which is particularly disadvantageous in the case of mechanical processing if a considerable time elapses between production, transportation and use. Moreover, with such synthetic superplasticisers, it is not possible to regulate the honey-like consistency like that provided by casein superplasticisers, so that a completely different performance profile is exhibited.

The prior art has provided proposals attempting to optimize this technology. Thus, JP 08217508 discloses a cement mixture comprising a polyethylene oxide and protein-containing thickener, a superplasticiser, a rapidly hardening agent and a setting retarder.

U.S. Pat. No. 5,494,516 describes a process in which a water-soluble polyalkylene oxide, a β-naphthalene sulphonate-formaldehyde condensate and a superplasticiser, selected from lingosulphate, melamine sulphonate formaldehyde condensate, carboxylates and styrene-maleic anhydride copolymers are brought together. The soluble polyalkylene oxide can be replaced by up to 50% hydroxyalkyl cellulose. It is also possible to use other superplasticisers. Application in conjunction with a spraying on of a cement or mortar composition is very specific.

FR 9 400 170 relates to a casein substitute, composed of a melamine formaldehyde condensate superplasticiser, cellulose, such as hydroxyethyl cellulose and/or a heteropolysaccharide such as xanthan gum.

According to EP 946 617 B1 carboxyl group-containing polymers with polyalkylene oxide ether side chains are used and phosphorus-containing compounds are added during polymerization.

WO 86/00291 describes a cement mixture comprising hydraulically setting cement, one or more flocculants, selected from among sodium alginate, cellulose ether, polyacrylates, polyacrylamides, guar gum, gelatin, chitosan, dextrin and dialdehyde starches, one or more water-reducing agents selected from among sulphonated naphthalene/formaldehyde condensate, sulphonated melamine/formaldehyde condensate, lignosulphonates, modified lignosulphonates, salts of polyhydroxycarboxylic acids, polyhydroxycarboxylic acids, glucosaccharides, copolymers of linear or cyclic C4- to C6-olefins and unsaturated ethylene dicarboxylic acids, an aggregate and water.

However, the prior art systems fail to provide satisfactory results. When using the above-described, synthetic superplasticisers the water is not retained in a suitable manner in the formulation, e.g. in the mortar, i.e. it is too rapidly lost. This behaviour, i.e. the water retention represents the strength of retention of the water and a suitable water balance must exist. The water losses are caused by an absorbent substrate or evaporation. In order to give such a material a suitable water retention and to prevent separation of the formulation, such materials consequently contain further additives, such as corresponding thickeners. When using excessive quantities of such additives, the viscosity becomes too high and there is a reduction to an unacceptable level of the flow characteristics of the material.

SUMMARY OF THE INVENTION

Accompanied by the further development of the above-discussed prior art, the problem of the invention is to provide a synthetic casein substitute in the form of an additive, which compared with casein-containing formulations, offers comparable or in certain cases even improved characteristics. In their final applications in hydraulically setting systems, such additives must also lead to improved use products. In particular, the water retention of hydraulically setting systems is to be improved.

According to the invention this problem is solved by an additive for hydraulically setting systems based on modified polycarboxylates and water-soluble ethers of high polymeric polysaccharides, optionally containing further conventional additives, characterized by a content of:

a) a water-soluble ether of cellulose or a cellulose-like compound with a viscosity of at least approximately 1,000 mPas, particularly at least approximately 2,000 mPas, measured as a 2% aqueous solution with a Brookfield viscosimeter at 20° C. and 20 rpm and b) a polycarboxylate, whose main chain is linked via ester, ether, imide and/or amide groups to polyethylene oxide-containing side chains.

A further object of the invention is a hydraulically setting mixture with a content of the above additive and the use of the additive as a constituent of hydraulically setting systems.

DETAILED DESCRIPTION

Figure 1:
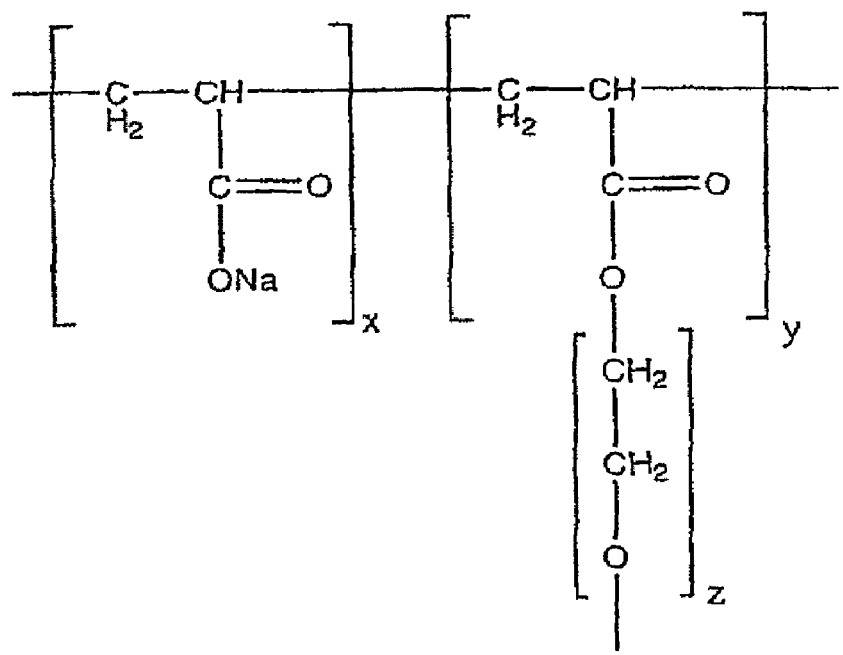
FIG. 1 shows an ester linkage of a polycarboxylate skeleton with an ethylene oxide side chain.

It has surprisingly been found that the invention can supply an additive, which as a result of a very specific combination of modified polycarboxylate superplasticiser and water-soluble ethers of a high polymeric polysaccharide with high viscosity leads to a considerable improvement to the rheological profile in hydraulically setting systems. The results obtainable can be equated with those of casein-containing formulations and are in part even superior to the latter. Thus, much better water retention values are obtained than with casein-containing systems with a corresponding composition.

Two components are essential for the additive according to the invention, i.e. the water-soluble ether a) and the modified polycarboxylate b), which will now be described in detail.

As water-soluble ethers a) of polysaccharides, according to the invention more particularly use is made of cellulose or cellulose-like compounds with a viscosity of at least approximately 1,000 mPas, particularly at least approximately 2,000 mPas, measured as a 2% aqueous solution using a Brookfield viscosimeter at 20° C. and 20 rpm. According to a particularly preferred embodiment of the invention the water-soluble ether a) has a viscosity of at least approximately 5,000 mPas, preferably at least approximately 10,000 mPas, more particularly more than approximately 15,000 mPas and very preferably above approximately 20,000 mPas and even more especially approximately 30,000 mPas.

Within the framework of the invention there is no particular restriction with respect to the cellulose ethers, provided that they have the indicated viscosity. In an exemplified enumeration reference is made to: alkyl cellulose ethers, hydroxyalkyl cellulose ethers, carboxyalkyl cellulose ethers, hydroxyalkylpolyoxyalkyl cellulose ethers and the like, as well as mixed ethers with at least two different substituents from the group alkyl, hydroxyalkyl, carboxyalkyl and/or hydroxyalkylpolyoxyalkyl with in each case C1- to C10-alkyl groups.

In the present invention the cellulose-like compounds comprise polysaccharides, which have a similar structure and/or characteristics to cellulose, but which do not necessarily have a similar structural form to cellulose, but can instead have a completely different structure, but similar characteristics to cellulose, e.g. with regards to the solution behaviour, chemical reactivity, water retention, air void stabilization, etc.

Examples are chemically modified or unmodified compounds, such as guar, dextran, chitin, chitosan, mannans, galactans, xylans, starch, xanthan gum, Welan gum, Gellan gum, alginates, arabinoxylan, glucan, gelatin, pectin, polyacrylates, polyethylene glycols, polyurethane thickeners, lattice silicates, etc. Such compounds together with their chemistry are known to the expert. These include the compound types such as are described in EP 1 180 535 A1, i.e. thickeners based on compositions with vinyl alcohol copolymers and cellulose ethers in which A) there are one or more completely or partly saponified vinyl alcohol polymers with a degree of hydrolysis of 75 to 100 mole % and a molecular weight Mw>100,000, obtainable a) by the saponification of vinyl acetate copolymers which, in addition to vinyl acetate units, also contain comonomer units, which are derived from one or more comonomers from the group comprising 1-alkyl vinyl ester with C1- to C5-alkyl groups of C1- to C5-carboxylic acids, allyl esters, vinyl esters of alpha-branched carboxylic acids with 5 to 12 C-atoms, acrylates and methacrylates of C1- to C18-alcohols or obtainable b) by acetalization of said saponified vinyl acetate copolymers or saponified vinyl acetate homopolymers with aliphatic or aromatic, optionally substituted aldehydes and B) one or more cellulose ethers.

It is important according to the invention that the viscosity of the water-soluble ether a) is at least approximately 1,000 mPas, because on dropping below this value there is a marked deterioration to the rheological properties and in particular the water retention drops to an unacceptable level.

In the present invention the viscosity is determined according to Brookfield, measured in a 2% aqueous solution at 20° C. and 20 rpm. The viscosity determination is described in detail in the examples. It is surprising that the low viscosity cellulose ethers normally used in the prior art, i.e. with a Brookfield viscosity well below 1,000 mPas, do not give the desired performance profiles. It would have been expected that as a result of the high viscosity of the ethers according to the invention, the formulations would thicken excessively and the materials would no longer run, but this is not the case.

According to the invention the water-soluble ether a) is preferably in the form of a cellulose ether and/or a guar ether. The cellulose ether advantageously has a degree of substitution (DS) in the range approximately 1.2 to 2.9, particularly approximately 1.6 to 2.2, but can also extend up to 3, which means a complete etherification of the cellulose. It is also preferable for the water-soluble ether a) to have etherification groups in the form of alkoxy groups, particularly in the form of alkoxy groups with 1 to 4 carbon atoms, methoxy, ethoxy and/or propoxy groups being mentioned in an exemplified manner. Particularly preferred cellulose ethers according to the invention are methyl celluloses, ethyl celluloses, propyl celluloses, hydroxymethyl celluloses, hydroxyethyl cellulose, hydroxypropyl celluloses, methyl hydroxymethyl celluloses, methyl hydroxyethyl celluloses, methyl hydroxypropyl celluloses, ethyl hydroxymethyl celluloses, ethyl hydroxyethyl celluloses, ethyl hydroxypropyl celluloses, propyl hydroxymethyl celluloses, propyl hydroxyethyl celluloses and propyl hydroxypropyl celluloses.

Figure 2:
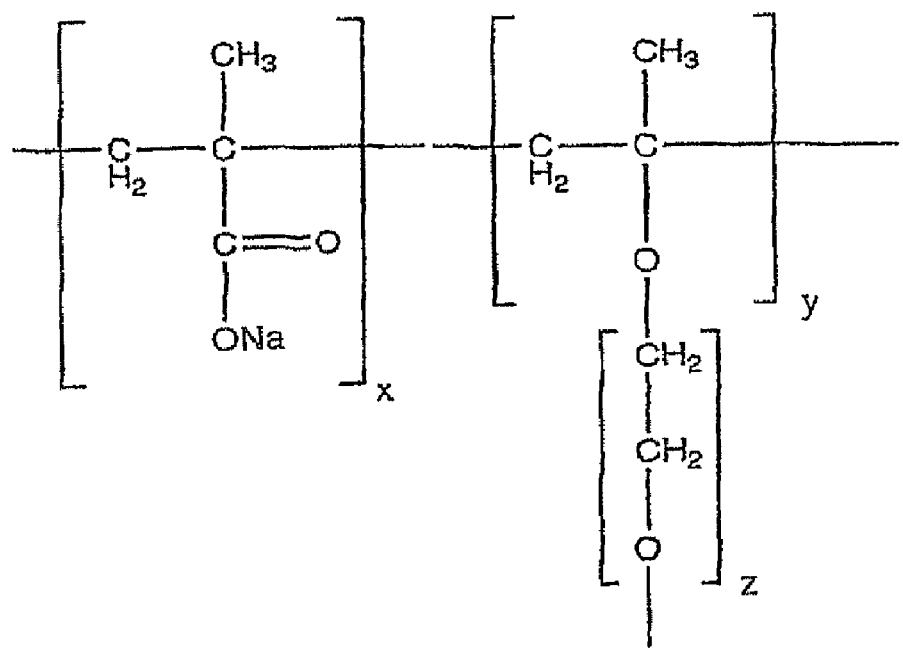
FIG. 2 shows an ether linkage of a polycarboxylate skeleton with an ethylene oxide side chain.
Figure 3:
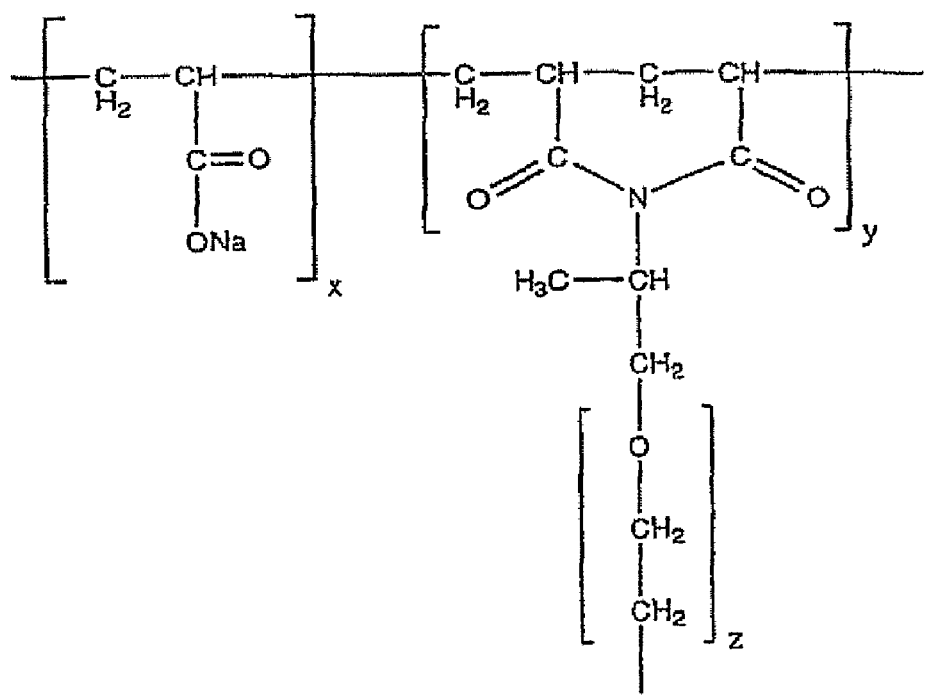
FIG. 3 shows an imide linkage of a polycarboxylate skeleton with an ethylene oxide side chain.
Figure 4:
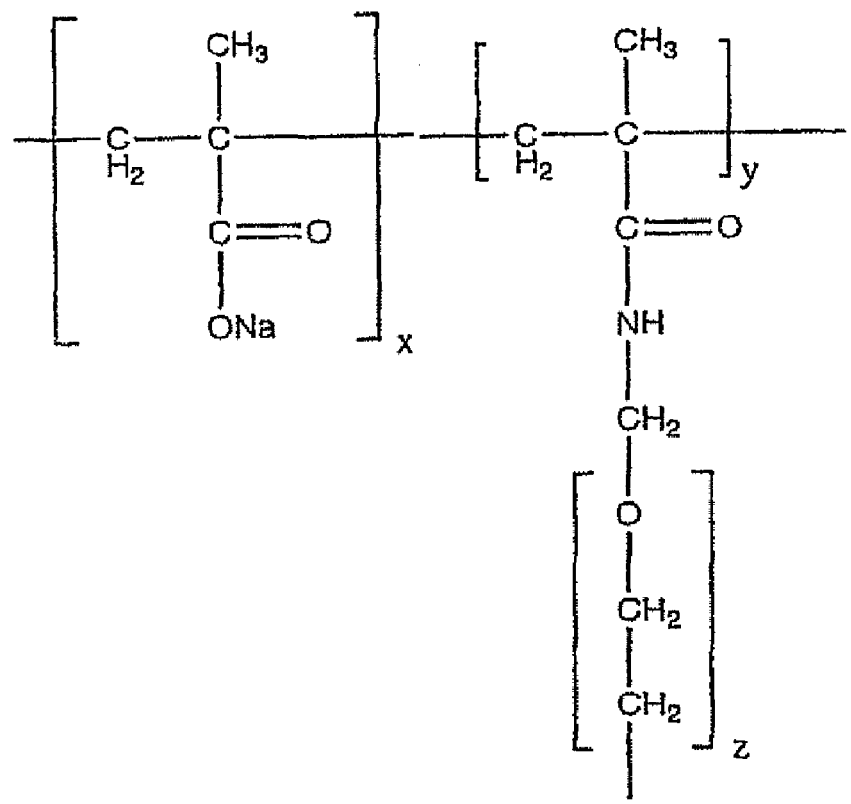
FIG. 4 shows an amide linkage of a polycarboxylate skeleton with an ethylene oxide side chain.

The second essential component according to the invention is a modified polycarboxylate b), whose main chain is linked via ester, ether, imide and/or amide groups to polyethylene oxide-containing side chains. The main chain is essentially a polymer with an anionic charge having several carboxylate groups. This main chain contains numerous ethylene oxide side chains, which can have different chain lengths and are connected to the main chain by an ester, ether, imide or amide linkage. For illustration purposes the attached FIGS. 1 to 4 show the individual linkages between the main and side chains in the general structural formulas. Thus, FIG. 1 shows an ester linkage of a polycarboxylate skeleton with an ethylene oxide side chain. FIGS. 2, 3 and 4 show linkages via an ether, imide and amide group respectively.

Within the scope of the present invention, there is no particular restriction regarding the structure of the side chains, provided that a polyethylene oxide is contained. However, great importance is attached to the linking of the side and main chains by means of an ester, ether, imide or amide group. This makes available high performance superplasticisers in the form of modified polycarboxylates, which have proved to be very efficient. Thus, it is e.g. possible to prolong the flow action by a high side chain density.

The total water requirement can be drastically reduced by using such superplasticisers. In addition, the high performance superplasticisers according to the invention, as opposed to melamine formaldehyde superplasticisers, do not suffer from a splitting off of formaldehyde. Thus, according to the invention use is preferably not made of melamine-formaldehyde condensates and/or naphthalene-formaldehyde condensates.

Figure 5:
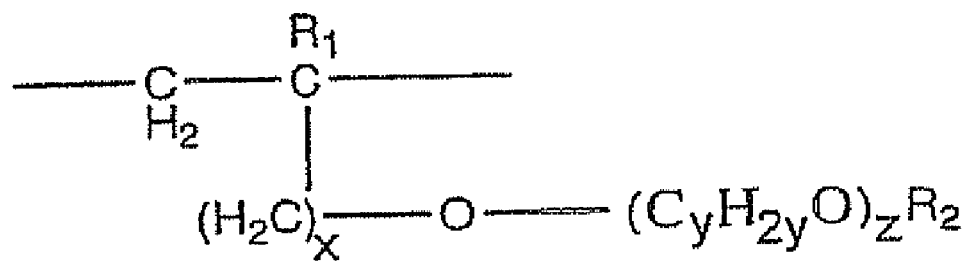
FIG. 5 shows a possible skeleton for an oxyalkylene glycol alkenyl ether.

The polycarboxylates according to the invention can e.g. be reaction products based on unsaturated monocarboxylic or dicarboxylic acid or the derivatives thereof, such as maleic acid or maleic anhydride and oxyalkylene glycol alkenyl ethers and approximately 1 to 99 wt. % of the carboxylic acid or derivative and approximately 99 to 1 wt. % oxyalkylene glycol alkenyl ether are polymerized with the aid of a radical starter. A possible skeleton for an oxyalkylene glycol alkenyl ether is shown in FIG. 5, where R1 represents H or an aliphatic hydrocarbon group with 1 to 10 C-atoms, which can be linear, branched, saturated or unsaturated, R2 is H, an aliphatic hydrocarbon group with 1 to 20 C-atoms, a cycloaliphatic group with 5 to 8 C-atoms, an optionally substituted aryl group with 6 to 14 C-atoms, in which x=0 to 3, y=2 to 4 and z=0 to 100. Examples are methyl polyethylene glycol-monoallyl ether or methyl polyethylene glycol-monovinyl ether.

Figure 6:
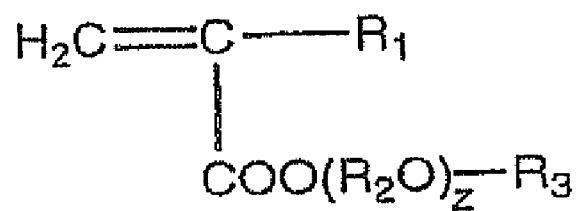
FIG. 6 shows an example for a skeleton of an (alkoxy) polyalkylene glycol mono(meth)acrylate.

Another particularly preferred variant of the invention comprises reacting 1 to 99 wt. % of an (alkoxy)polyalkylene glycol mono(meth)acrylate, (alkoxy)polyalkylene glycol mono(meth)allyl ether or (alkoxy)polyalkylene glycol mono (meth)vinyl ether with 99 to 1 wt. % of an unsaturated monocarboxylic or dicarboxylic acid or derivative thereof, such as (meth)acrylic acid. An example for a skeleton of an (alkoxy) polyalkylene glycol mono(meth)acrylate is shown in FIG. 6, in which R1 is H or an aliphatic hydrocarbon group with 1 to 5 C-atoms, which is linear, branched, saturated or unsaturated, R2O is an oxyalkylene group with 2 to 4 C-atoms, R3 is hydrogen or an aliphatic hydrocarbon group with 1 to 22 C-atoms and z=0 to 100.

The polycarboxylates according to the invention can also be based on water-soluble or water-dispersible polymers, which contain carboxyl groups and have polyalkylene oxide ether side chains, e.g. obtainable by radical polymerization of ethylenically unsaturated monomers, which contain carboxyl groups, and ethylenically unsaturated monomers, which have side chains, in the presence of phosphorus-containing compounds.

According to the invention, the polycarboxylate can also have further functional groups, such as e.g. hydroxyl, ester, ether, amide or aldehyde groups, to the extent that the effects sought by the invention are not impaired.

In particularly preferred manner, the polyethylene side chain-containing polycarboxylate according to the invention has units, which are e.g. based on the following monomers: (meth)acrylic acids, their monovalent and divalent metal salts, ammonium salts and organic amino salts, esters of aliphatic alcohols with 1 to 20 C-atoms with (meth)acrylic acid, unsaturated dicarboxylic acids, such as maleic, fumaric, itaconic and citraconic acids, their anhydrides, monoesters or diesters of said acids with an aliphatic alcohol having 1 to 20 C-atoms or a glycol with 2 to 4 C-atoms or a polyalkylene glycol containing 2 to 100 of said glycols, saturated or unsaturated amides, such as (meth)acrylamide and (meth)acrylalkylamide, vinyl or allyl ethers, vinylesters, such as vinyl acetate and vinyl propionate, aromatic vinyls, such as styrene, unsaturated suiphonic acids, such as vinyl sulphonic acid, (meth)allyl sulphonic acid, suiphoethyl (meth)acrylate, 2-(meth)acrylamide-2-methyl propane sulphonic acid and styrene suiphonic acid and their salts.

Within the scope of the present invention obviously numerous other embodiments are obvious to the expert and the above variants can serve as an orientation.

It is appropriate according to the teaching of the invention if for approximately one part by weight modified polycarboxylate b) there are approximately 0.01 to 2 parts by weight, preferably approximately 0.05 to 1.5 parts by weight, more particularly approximately 0.08 to 1.2 parts by weight, and in particularly preferred manner approximately 0.1 to 1.0 parts by weight water-soluble ethers a).

Preferably, the additive according to the invention can incorporate further conventional additives, such as e.g. agents for controlling the setting rate, i.e. retardants, such as fruit acids, or accelerators such as lithium carbonate, calcium fluoride or calcium formate, agents for controlling the strength structure, defoamers, inorganic or organic binders, such as copolymers or terpolymers in the form of dispersion powders and fully and partially hydrolysed polyvinyl alcohol with low, medium and high molecular weight, polyvinyl pyrrolidone, polyethylene glycol (EO) and ethylene oxid-propylene oxid (EO/PO) blockcopolymers, rheology modifiers which might contain associative monomers, such as polyurethane thickeners, starches, dextrines and polyacrylates, fly ash, kaolin, water repellents, such as stearates or oleates, agents for controlling the final strength, such as cellulose fibres, surfactants, pigments such as iron or chromium oxides, fillers such as sand, limestone, quartz powder and/or calcium carbonate. This list does not claim completeness and further additives are in fact known to the expert. Preferably for approximately one part by weight of a mixture of components a) and b) there are at least approximately 0.005 parts by weight, particularly at least approximately 0.05 parts by weight of additives, excluding binders.

In the present invention particularly preferred additives are constituted by dispersion powders, which in the hydraulically setting systems used according to the invention bring about an improvement of certain characteristics. In particular, through the use of dispersion powders it is possible to increase the adhesion strength to the substrate and also the bending strength, the deformability and abrasion resistance are improved and the crack formation tendency is drastically reduced. With such an addition it is possible to bring about adequate adhesion even to substrates such as metal or wood. Thus, the use of dispersion powders ensures a reliable quality of the characteristics profiles in the use products.

Appropriately for approximately 1 part by weight of the mixture of components a) and b), there is at least approximately 1 part by weight organic binder, such as dispersion powder and in particular a quantity of approximately 2 to 50 parts by weight thereof. In the hydraulically setting mixtures in which the additive according to the invention is used, the hydraulically setting component can be based on cement, optionally accompanied by the incorporation of lime hydrate and/or gypsum. Preferably the cement is in the form of Portland cement and/or aluminous cement. According to the invention it is particularly appropriate that for approximately 1 part by weight additive, based on the sum of the components a) and b), there are approximately 80 to 1,500 parts by weight and in particular approximately 100 to 500 parts by weight of hydraulically setting components.

The additive according to the invention, as a constituent of hydraulically setting systems, is more particularly used in dry, grouting, injection and repair mortars, flow control materials, plasters, sealing sludges, fillers, surfacers, finished gypsum parts, concretes, such as flooring plaster, continuously reinforced concrete, close texture lightweight concrete, high strength concrete, normal concrete, in situ concrete, airplaced concrete, exposed concrete, prestressed concrete, self-sealing concrete (SCC), ready-mixed concrete, preferably in self-levelling priming and compensating materials, particularly self-levelling floor compensating materials.

It has been found that as a result of the inventive combination of the two components a) and b), synergistic effects occur in the hydraulically setting systems or mixtures used.

Thus, the water-soluble ether a) is used in roughly comparable qualities to the prior art. However, the content of high performance superplasticiser according to the invention can be significantly reduced. For example, compared with the conventionally used quantity of a casein superplasticiser, preferably only approximately ¼ to ⅕ thereof is used in the superplasticiser according to the invention. Also compared with other known high performance superplasticisers according to the prior art much lower contents are required in order to provide the desired characteristics profiles, which leads to a significant cost reduction.

Therefore the superplasticiser according to the invention has a high liquefying action when very small quantities are used. The advantage of a good liquefaction is in particular that less water is needed and a better flowing together of the formulations is obtained.

Although a much lower superplasticiser quantity is used in the additive according to the invention, the additive-containing, hydraulically setting mixtures according to the invention surprisingly have comparable and in part much better characteristics to casein-containing formulations. Thus, a rheological flow behaviour comparable to casein formulations is obtained.

Conventionally the prior art only uses low viscosity cellulose ethers for hydraulically setting formulations, such as in particular floor levelling materials, i.e. having a Brookfield viscosity well below 1,000 mPas. It is therefore extremely surprising that high viscosity cellulose ethers such as are used in the invention are suitable for such applications. As a result of the high viscosity it would be expected that there would be an excessive thickening of the formulation, which would greatly impair the running of the materials. However, this has not been observed with the inventive combination of thickener and superplasticiser and instead excellent flow characteristics occur. Thus, the hydraulically setting mixtures according to the invention have a honey-like flow behaviour, such as in particular only occurs with casein-containing materials and which cannot be achieved with the known synthetic superplasticisers.

Moreover, with the mixtures according to the invention much higher water retention values are obtained. The water retention is controlled via the water-soluble ether a). As has already been explained, a rise in the ether quantity leads to a marked thickening of the material, so that flowability is worse. It is therefore completely unexpected that in spite of the use of equal amounts of water-soluble ether a) compared with the prior art and a much smaller quantity of superplasticiser b), an unexpected rise in the water retention is obtained as a result of the cooperation of the two components.

In the hydraulically setting mixtures containing the additive according to the invention water retention values are obtained, which are better than the water retention value of a casein superplasticiser-containing hydraulically setting mixture with the same composition by more than approximately 20%, preferably more than approximately 50%, especially more than approximately 80% and in particularly preferred manner more than approximately 100%. A casein superplasticiser-containing hydraulically setting mixture with the same composition in this context means that all the constituents are identical and present in the same quantity, except for the casein superplasticiser, which is added in a quantity such that a comparable consistency is obtained.

The invention also leads to a number of other advantages. The high performance superplasticiser according to the invention leads to significant water economies. Generally much more water is required for mixing the formulation than for the subsequent setting or hardening process. The excess, evaporating water leads to the formation of cavities in the hardened material and therefore to a significantly inferior mechanical strength and stability. As opposed to this, the high performance superplasticiser according to the invention can significantly reduce the excess water percentage with a predetermined processing consistency. The particularly good processability of the materials according to the invention is e.g. revealed in good flow characteristics, i.e. better running and flowing together without sediment formation.

The pumpability and stability of the hydraulically setting systems is improved by even small quantities of water-soluble ether a), so that the latter gives the systems an improved processability, in addition to a good thickening action. The prevention of bleeding prevents sedimentation and contributes to homogeneity in hydraulically setting systems.

When used the mixtures according to the invention satisfy the highest demands regarding processability and provide the desired strength and durability, high initial and final strengths, improved tightness, reduced separation and bleeding. The mixtures harden rapidly. The minimum shrinkage tendency without cracking, such as exists according to the invention, is very important, particularly for floor materials applied in relatively thin layers. It is also possible by additives in the form of dispersion powders to improve characteristics such as the adhesion strength, scratching and abrasion resistance and bending strength. The materials also have a so-called self-healing effect, i.e. two separately applied layers give a uniform surface. The surface of the end products has the desired high quality.

The compatibility of the two components exists in all cements. However, in individual cases advantages arise when using special compounds, optionally accompanied by the incorporation of additives, which enable desired characteristics to be set in planned manner. The invention consequently leads to a balanced system and flexibility is brought about by adding additives.

The invention is described in greater detail hereinafter relative to examples not intended to restrict the teaching of the invention. Further embodiments are obvious to the expert within the framework of the disclosure of the present invention.

EXAMPLES

The examples use the following compounds:

| | |
|---|---|
| Culminal © MHEC 250000PFF*): | unmodified**) methyl hydroxyethyl cellulose with a viscosity of 5,000 mPas, determined as 2% aqueous solution with Brookfield RV at 20° C. and 20 rpm; |
| Culminal © C4045*): | modified***) methyl cellulose with a viscosity of 38,000 to 51,000 mPas, determined as 2% aqueous solution with Brookfield RV at 20° C. and 20 rpm; |
| Tylose © H4000P*): | unmodified**) methyl hydroxyethyl cellulose with a viscosity of 3,800 to 5,300 mPas, determined as .9% (dry substance) aqueous solution with Brookfield RV at 20° C. and 20 rpm; |
| Tylose © MH60001P4*): | modified***) methyl hydroxyethyl cellulose with a viscosity of 27,000 to 34,000 mPas, determined as 1.9% (dry substance) aqueous solution with Brookfiled RV at 20° C. and 20 rpm; |
| Natrosol 250 GXR: | low viscosity hydroxyethyl cellulose with a viscosity of 250 to 450 mPas, determined according to Brookfield LVF at 25° C. in 2% solution; |
| Melment © F10: | melamine formaldehyde superplasticiser; |
| Melflux © 1641 F: | polyether carboxylate superplasticiser according to the invention; |
| Elotex Flow 8200: | polyether carboxylate superplasticiser according to the invention; |
| Trisodium citrate: | retardant; |
| Tartaric acid: | retardant; |
| Quartz sand: | filler; |
| Omyacarb 10BG: | filler; |
| Quartz powder K4: | filler; |
| Agitan P800: | defoamer; |
| Lithium carbonate: | strength-increasing additive |
| Elotex FL2211: | Dispersion powder (organic binder based an ethylene-vinyl acetate copolymer). |

*)cellulose ether according to the invention
**)unmodified: no additives
***)modified: mixed with additives.

The characteristics of the compositions are determined with the aid of the following test methods:

a) Determination of the Extent of Spreading of a Levelling Material 100 g of dry mortar are mixed with water. A metal ring (diameter 53 mm) is placed on a horizontal glass plate and following a maturing time of 3 minutes the mortar is emptied into the ring. 1 minute after removing the ring the diameter of the mortar mass which has flowed is measured.

b) Determination of the Scratch Hardness

With the mortar one day old, it is scratched with a sharp object and the surface hardness evaluated.

c) Determination of the Water Retention

The mixed mortar is emptied with a specific coating thickness onto a highly absorbent tile. The time up to which the watery gloss on the surface has disappeared is measured.

d) Viscosity Determination 30 g of hot water (approx. 80 to 90° C.) are placed in a 200 ml beaker and stirred with a propeller stirrer. 2.0 g of cellulose ether are slowly added. Stirring. continues for a certain time until the cellulose ether has dissolved. 70 g of cold water (approx. 5 to 10° C.) are slowly added, accompanied by stirring. Further stirring takes place and the solution cools to 20 or 25° C., so that the Brookfield viscosity can be measured at 20 rpm. It is ensured that no air is stirred in throughout the stirring process.

The formulations given in the following table were prepared and tested.

| Formulation | Comp. Ex. 1 | Comp. Ex. 2 | Comp. Ex. 3 | Comp. Ex. 4 | Ex. 1 | Ex. 2 | Ex. 3 | Ex. 4 | Ex. 5 |
|---|---|---|---|---|---|---|---|---|---|
| Cement CEM I 52.5 | 26.00 | 26.00 | 26.00 | 26.00 | 26.00 | 26.00 | 26.00 | 26.00 | 26.00 |
| Aluminous cement | 10.00 | 10.00 | 10.00 | 10.00 | 10.00 | 10.00 | 10.00 | 10.00 | 10.00 |
| Lime hydrate | 3.00 | 3.00 | 3.00 | 3.00 | 3.00 | 3.00 | 3.00 | 3.00 | 3.00 |
| Hard moulding plaster No. 1 | 4.00 | 4.00 | 4.00 | 4.00 | 4.00 | 4.00 | 4.00 | 4.00 | 4.00 |
| Quartz sand 0.1-0.3 mm | 38.90 | 39.25 | 43.44 | 43.85 | 39.00 | 39.00 | 43.84 | 43.64 | 43.85 |
| Omyacarb 1OBG | 5.00 | 5.00 | 10.00 | 10.00 | 5.00 | 5.00 | 10.00 | 10.00 | 10.00 |
| Quartz powder K4 | 9.80 | 9.80 | | | 9.80 | 9.80 | | | |
| Casein 110 mesh | 0.40 | | | | | | | | |
| Elotex Flow 8200 | | 0.10 | | | 0.15 | 0.15 | 0.10 | | 0.15 |
| Trisodium citrate | 0.25 | | | | | | | | |
| Tartaric add | | 0.25 | 0.25 | 0.25 | 0.25 | 0.25 | 0.25 | 0.25 | 0.25 |
| Agitan P800 | 0.10 | 0.05 | 0.05 | | 0.05 | 0.05 | 0.05 | 0.05 | |
| Agitan P843 | | | | 0.05 | | | | | 0.05 |
| Elotex FL2211 | 2.50 | 2.50 | 2.50 | 2.50 | 2.50 | 2.50 | 2.50 | 2.50 | 2.50 |
| Natrosol250GXR | 0.05 | 0.05 | | | | | | | |
| Cuiminal ®MHEC 25000PFF | | | | | 0.05 | | | | |
| Culminal ®C4045 | | | | | | 0.05 | | | |
| Tylose ®H4000P | | | 0.06 | | | | 0.06 | 0.06 | |
| Tylose ®MH60001P4 | | | | 0.05 | | | | | 0.05 |
| Lithium carbonate | | | 0.20 | | | | 0.20 | 0.20 | |
| Melment ®F10 | | | | 0.50 | | | | | |
| Sodium Lignosulphonate | | | | 0.70 | | | | | |
| Melflux ®1641F | | | | | | | | 0.30 | |
| Water requirement | 22% | 22% | 23% | 21% | 22% | 22% | 22% | 22% | 21% |
| Spreading of composition dia. mm after 2 min | 179 | 183 | 165 | 135 | 171 | 175 | 172 | 177 | 171 |
| Water retention on ceramic tile, time | 4' | 2' 45" | 3' | 3' 10" | 6' 30" | 6' | 5' | 5' | 6' 45" |
| Scratch hardness after 1 day, 23° C./ 50% rel. hum, evaluation | OK | OK | OK | OK but many cracks | OK | OK | OK | OK | OK |

Comparison example 1 is a known, casein-containing formulation with standard characteristics.

Comparison example 2 contains a synthetic carboxylate superplasticiser and a cellulose ether with a standard viscosity profile, such as is conventionally used in self-levelling floor compensating materials. The results reveal a comparable flow (extent of spread), but a much lower water retention compared with the cellulose ether, which is unacceptable. This comparison example shows that the materials float off, i.e. are too watery. The water retention is much lower than in the casein comparison product, so that these compositions provide completely inadequate characteristics.

Comparison example 3 uses Melment© F10, a standard melamine formaldehyde condensate superplasticiser, together with a cellulose ether having a viscosity in the range according to the invention. As a result of the low efficiency of Melment© F10 a five times higher quantity has to be used than in the case of a carboxylate superplasticiser according to the invention. In spite of this the amount of spread is low and the water retention completely inadequate. In addition, on hardening the material suffers from numerous cracks. Thus, in comparison example 3 use is made of a melamine formaldehyde superplasticiser with a high viscosity cellulose ether, which roughly corresponds to the teaching of FR 2 714 912. This composition flows very poorly and also has a relatively low level of spread, so that its characteristics profile is completely inadequate.

Comparison example 4 has a formulation with completely inadequate characteristics using sodium lignosulphonate as the superplasticiser and Tylose© MH60001P4 as the superplasticiser. This roughly corresponds to the teaching of EP 188 471 B1. As is apparent from the comparison example, the amount of spread is very poor and the water retention with 3'10" is completely inadequate.

In the case of examples 1 to 5 according to the invention comparable parameters are obtained to casein with 0.1 or 0.15% of superplasticiser according to the invention. The amount of spread is lower, but is still good. The water retention is significantly improved, namely 5 or 6 minutes compared with 4 minutes for casein. Similar results are obtained with a further commercial product (SKW Melflux© 1641F, polycarboxylate superplasticiser), but higher quantities are required.

In examples 1 to 5 according to the invention, the best results are obtained with 0.15% superplasticiser according to the invention and 0.05% cellulose ether with a viscosity of 25,000 mPas (example 1), 4,000 mPas (example 2) and 27,000 to 34,000 mPas (example 5), giving an excellent water retention of 6.5, 6 and 6.75 minutes respectively.

What is claimed is:

1. A method to modify hydraulically setting systems, the method comprising adding an additive to the hydraulically setting systems, the additive comprising:
    a) a water-soluble ether of cellulose ether and/or guar ether with a viscosity of at least approximately 20,000 mPas, measured as a 2% aqueous solution with a Brookfield viscosimeter at 20° C. and 20 rpm, and
    b) a modified polycarboxylate, of which the main chain is linked via ester, ether, imide and/or amide groups with polyethylene oxide-containing side chains,
    wherein there are approximately 0.05 to 1.5 parts by weight water-soluble ether a) for approximately 1 part by weight modified polycarboxylate b).

2. The method according to claim 1 wherein there are approximately 0.1 to 1.0 parts by weight water-soluble ether a) for approximately 1 part by weight modified polycarboxylate b).

3. The method according to claim 1 wherein the water-soluble ether a) is a celluloseether with a degree of substitution of approximately 1.2 to 2.9.

4. The method according to claim 1 wherein the water-soluble ether a) comprises alkoxy etherification groups.

5. The method according to claim 4 wherein the alkoxy groups are chosen from methoxy, ethoxy and/or propoxy groups.

6. The method according to claim 1, wherein the additive further comprises agents for controlling the setting rate and strength structure, defoamers, organic or inorganic binders, water repellents, surfactants, pigments, fillers, quartz powder and/or calcium carbonate.

7. The method according to claim 1, wherein the additive further comprises an organic binder in the form of a dispersion powder.

8. The method according to claim 1 wherein, based on approximately 1 part by weight of a mixture of components a) and b), the additive contains at least approximately 0.005 parts by weight additives, excluding binders.

9. The method according to claim 6 wherein the additive further comprises an organic binder, and there are at least approximately 1 part by weight organic binder for 1 part by weight of the mixture of components a) and b).

10. A hydraulically setting mixture obtained by the method according to claim 1.

* * * * *